United States Patent
Hansen et al.

(10) Patent No.: US 7,727,484 B2
(45) Date of Patent: Jun. 1, 2010

(54) FLUID BED APPARATUS MODULE AND METHOD OF CHANGING A FIRST MODULE FOR A SECOND MODULE IN A FLUID BED APPARATUS

(75) Inventors: Ove Emil Hansen, Allerod (DK); Trevor Gordon Page, Dibden Purlieu (GB); Michel Simon Waldron, Calmore (GB)

(73) Assignee: Collette NV, Wommelgem (BE)

( * ) Notice: Subject to any disclaimer, the term of this patent is extended or adjusted under 35 U.S.C. 154(b) by 341 days.

(21) Appl. No.: 11/722,582

(22) PCT Filed: Dec. 23, 2004

(86) PCT No.: PCT/IB2004/004266

§ 371 (c)(1),
(2), (4) Date: Jun. 22, 2007

(87) PCT Pub. No.: WO2006/067546

PCT Pub. Date: Jun. 29, 2006

(65) Prior Publication Data

US 2008/0107570 A1    May 8, 2008

(51) Int. Cl.
    B01J 8/18    (2006.01)
    B01J 8/36    (2006.01)
    C01B 31/30   (2006.01)
    F26B 3/08    (2006.01)
    C23C 16/00   (2006.01)

(52) U.S. Cl. .............. 422/139; 422/142; 118/716; 118/717; 34/359; 423/439

(58) Field of Classification Search .......... 422/139, 422/142; 118/716, 717; 34/359; 423/439
See application file for complete search history.

(56) References Cited

U.S. PATENT DOCUMENTS

| 3,571,946 | A | * | 3/1971  | Karweil et al. ........... 34/591 |
| 3,723,395 | A |   | 3/1973  | Warzell |
| 4,010,002 | A | * | 3/1977  | Degel et al. ........... 422/111 |
| 4,961,705 | A |   | 10/1990 | Schulz et al. |
| 4,967,486 | A | * | 11/1990 | Doelling ............. 34/259 |

(Continued)

FOREIGN PATENT DOCUMENTS

EP    0 001 358 A    4/1979

(Continued)

*Primary Examiner*—Walter D Griffin
*Assistant Examiner*—Huy-Tram Nguyen
(74) *Attorney, Agent, or Firm*—Sughrue Mion, PLLC

(57) ABSTRACT

A fluid bed apparatus module (1) comprises an outer wall enclosing a processing chamber (9) and has a lower flange connection (4) and an upper flange connection (5), the lower flange connection being adapted to connection with a flange connection (14) of a supply of fluidising gas, and the upper flange connection being adapted to connection with a flange connection (17) of a filter chamber (18) for gas discharge. At least one partition element (6) is arranged in the processing chamber, so that at least one elongated channel is formed in the processing chamber, thereby defining a plug-flow area, and at least one substantially continuous product inlet (10) and at least one substantially continuous product outlet (11) are arranged in the module. Furthermore, a method comprises changing a first module for a second module in a fluid bed apparatus.

16 Claims, 7 Drawing Sheets

U.S. PATENT DOCUMENTS

Figure 1:
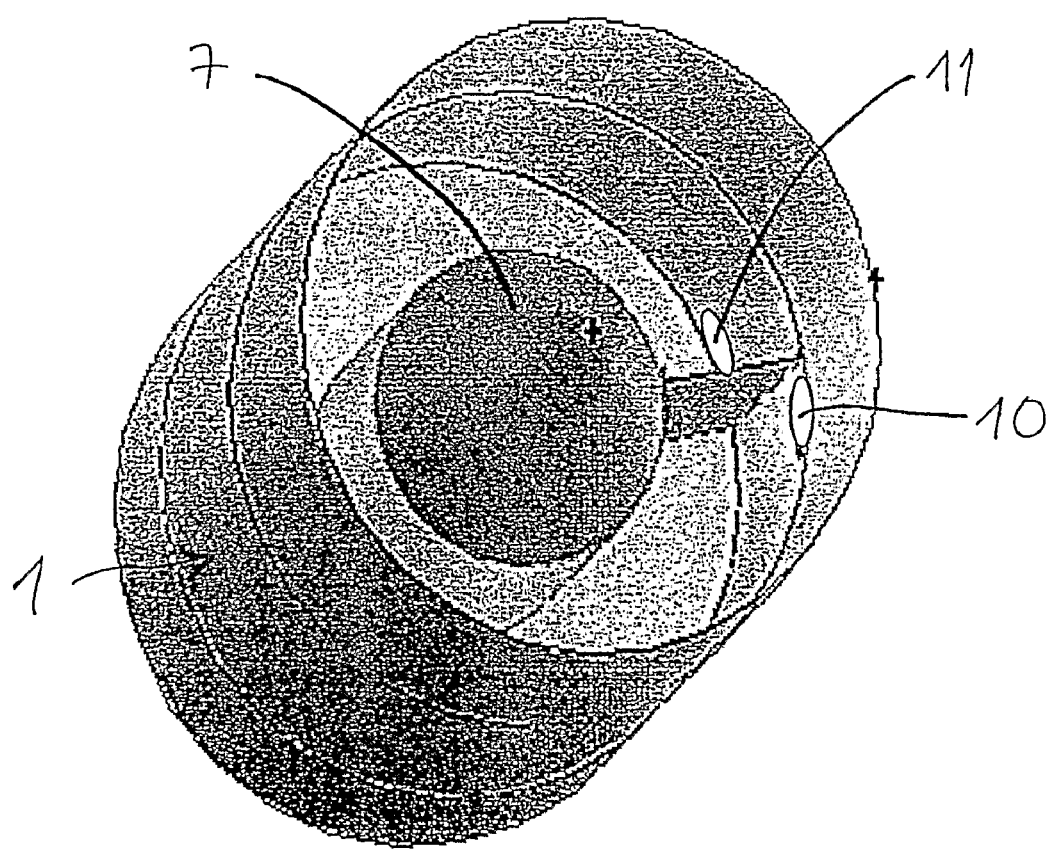

| | | | |
|---|---|---|---|
| 5,459,318 A * | 10/1995 | Cacho et al. | 250/341.2 |
| 5,615,493 A | 4/1997 | Funder et al. | |
| 5,632,102 A * | 5/1997 | Luy et al. | 34/582 |
| 5,782,011 A * | 7/1998 | Boersen et al. | 34/366 |
| 6,383,553 B1 | 5/2002 | Tondar et al. | |
| 2001/0048913 A1 * | 12/2001 | Nakatani et al. | 423/439 |
| 2003/0230004 A1 * | 12/2003 | Borsavage et al. | 34/576 |

FOREIGN PATENT DOCUMENTS

| | | |
|---|---|---|
| EP | 0 403 820 A | 12/1990 |
| EP | 0 474 949 A1 | 3/1992 |
| EP | 0 507 038 A1 | 10/1992 |
| EP | 0 837 034 A | 4/1998 |
| EP | 0 876 203 B1 | 9/1999 |
| GB | 2 072 039 A | 9/1981 |
| GB | 2 086 257 A | 5/1982 |
| GB | 2 167 679 A | 6/1986 |
| WO | WO 03/033126 A1 | 4/2003 |

* cited by examiner

FLUID BED APPARATUS MODULE AND METHOD OF CHANGING A FIRST MODULE FOR A SECOND MODULE IN A FLUID BED APPARATUS

The present invention relates to a fluid bed apparatus module comprising an outer wall enclosing a processing chamber and having a lower flange connection and an upper flange connection, the lower flange connection being adapted to connection with a flange connection of a supply of fluidising gas, and the upper flange connection being adapted to connection with a flange connection of a filter chamber for gas discharge.

U.S. Pat. No. 5,615,493 (Niro Holding A/S) discloses a spray drying device having a drying chamber and at the bottom thereof a fluidised bed of the continuous-type. The fluidised layer is separated by means of a cylindrical separation wall into a first central zone with back-mixing and a second surrounding channel-formed zone of the plug-flow type.

U.S. Pat. No. 3,723,395 discloses a batch-type apparatus for chemical reactions and drying operations. The apparatus comprises a cylindrical reactor provided with an internal flexible divider extending from a bed plate and well above the expanded level of the fluidised bed, thereby dividing the cylindrical reactor into two batch reaction chambers having variable volumes. Each batch reaction chamber has separate product inlet and outlet connections arranged through the peripheral wall of the cylindrical reactor and connected through piping and valves with a product supply and exit, respectively. It is indicated that the combined output of the two batch reaction chambers approaches the output of a continuous reactor.

WO 03/033126 discloses a fluidised bed apparatus comprising one or more modules for treating material, whereby each module comprises a number of separately located batch fluidising units, each of which comprises a replaceable fluidising batch chamber. Each of the fluidising units is by means of piping connected to a common gas treatment unit. One or several of said units may be operated simultaneously, whereby the material processed in each of the units may be identical or different, and the amounts thereof in each of the units may be equal or different.

Furthermore, a modular batch fluid bed apparatus is known, available from Aeromatic-Fielder, whereby different process modules may be installed into a process common chamber, thereby maximizing flexibility. Optional modules are available for drying, granulating, and coating.

In the pharmaceutical industry, batch processors are usually preferred due to product traceability requirements. However, handling of the separate batches may be cumbersome and labour-intensive, as manual filling and emptying of the processing chamber may be required between processing of each individual batch.

The object of the present invention is to provide a fluid bed apparatus module for use in a fluid bed apparatus of the batch-type design, whereby handling is facilitated.

In view of this object, at least one partition element is arranged in the processing chamber, so that at least one elongated channel is formed in the processing chamber, thereby defining a plug-flow area, and at least one substantially continuous product inlet and at least one substantially continuous product outlet are arranged in the module.

In this way, a fluid bed apparatus may generally be utilized with a batch-processing module of the known type, and in cases where special requirements, such as ease of handling, arise, the fluid bed apparatus module according to the invention may be substituted for the batch-processing module, whereby a continuous process may be run through the at least one elongated channel, thereby facilitating the production. In this way, one fluid bed apparatus may serve both in situations, where a batch processor is preferred, and in situations, where the advantages of a continuous processor are desired. It is also an advantage that the continuous process may be operated in a contained way, so that personnel is not exposed to the material being processed.

In a preferred embodiment, the partition element has the form of a core arranged centrally in the processing chamber and at least one partition wall extending between the core and the outer wall. Thereby, the elongated channel is following a smooth curve, so that edges where product may clog up are avoided.

In an embodiment, each elongated channel is provided with a product inlet arranged through the outer wall at a first end of the channel and a product outlet arranged through the outer wall at a second end of the channel.

An upper end of the core may be closed by means of a cone-shaped top part in order to avoid product build-up on top of the core.

A lower end of the cone-shaped top part may be located below a midpoint between the upper flange connection and the lower flange connection, whereby a suitable height of the fluid bed may be achieved.

A bed plate having inlet openings for a fluidising gas may be arranged at the lower flange connection and extend between the core and the outer wall. It may be advantageous to provide a dedicated bed plate on the module, whereby the design of the bed plate may be adapted to the core, whereby, especially, the bed plate may be fitted tight to the central core.

In a preferred embodiment, a length L of each channel is more than 5 times greater than, and preferably more than 10 times greater than, a horizontal width W of said channel. Thereby, a suitably slender design of the channel is achieved, whereby it is made possible to obtain an adequate plug-flow of the product to be treated.

In another embodiment, the core is hollow and surrounds a separate fluid bed area of the back-mixing type. In this way, a continuous two-step process is possible, whereby the product is first treated in the central fluid bed area of the back-mixing type and secondly treated in the surrounding fluid bed area of the plug-flow type.

The core may be cylindrical, the outer wall may have a circular cross-section, and the core may be arranged substantially concentrically with the outer wall, whereby a uniform width of the channel may be achieved.

In an embodiment, a device for monitoring product characteristics, such as by means of near-infrared spectroscopy or microwaves, is arranged at a product outlet end of at least one of the channels. Thereby, the condition of the nearly finished product may be monitored and utilized in controlling relevant process parameters in order to obtain a desired quality of the treated product.

The device for monitoring product characteristics may be placed at a window arranged in a wall of the fluid bed apparatus module.

The invention furthermore relates to a fluid bed apparatus comprising a fluid bed apparatus module according to the above.

In an embodiment, the upper flange connection and the lower flange connection of the fluid bed apparatus module are connected with corresponding flange connections of a plenum chamber and of a filter chamber, respectively, by means of air cylinder driven clamping devices or similar suitable devices. Thereby, easy change of the module is facilitated.

In an embodiment, the apparatus comprises a computer adapted to control operational parameters, such as flow rate and temperature of the fluidising gas and product inlet flow, in dependence of measured parameters, such as residual moisture of product treated in the apparatus measured by means of the device for monitoring product characteristics.

The invention furthermore relates to a method of changing a first module for a second module in a fluid bed apparatus, said modules comprising an outer wall enclosing a processing chamber, whereby lower and upper flange connections of the first module are disconnected from corresponding lower and upper flange connections of a supply of fluidising gas and of a filter chamber for gas discharge, respectively, of the apparatus, the first module is replaced by the second module, and lower and upper flange connections of the second module are connected with the corresponding lower and upper flange connections of the apparatus.

The method is characterized by that a first module of the batch-type is replaced by a second module of the continuous-type, thereby arranging at least one partition element in the processing chamber, so that at least one elongated channel is formed in the processing chamber, thereby defining a plug-flow area, by that at least one product inlet is connected with a substantially continuous product supply of the apparatus, and by that at least one product outlet is connected with a substantially continuous product discharge of the apparatus. Thereby, the above-mentioned advantages may be obtained.

In an embodiment, the partition element is arranged in the form of a core in the processing chamber and at least one partition wall extending between the core and the outer wall. Thereby, the above-mentioned advantages may be obtained.

In an embodiment, a near-infrared device, a microwave device or the like, arranged at a window in a wall of the second module, is connected with a computer of the apparatus. Thereby, the above-mentioned advantages may be obtained.

Figure 2:
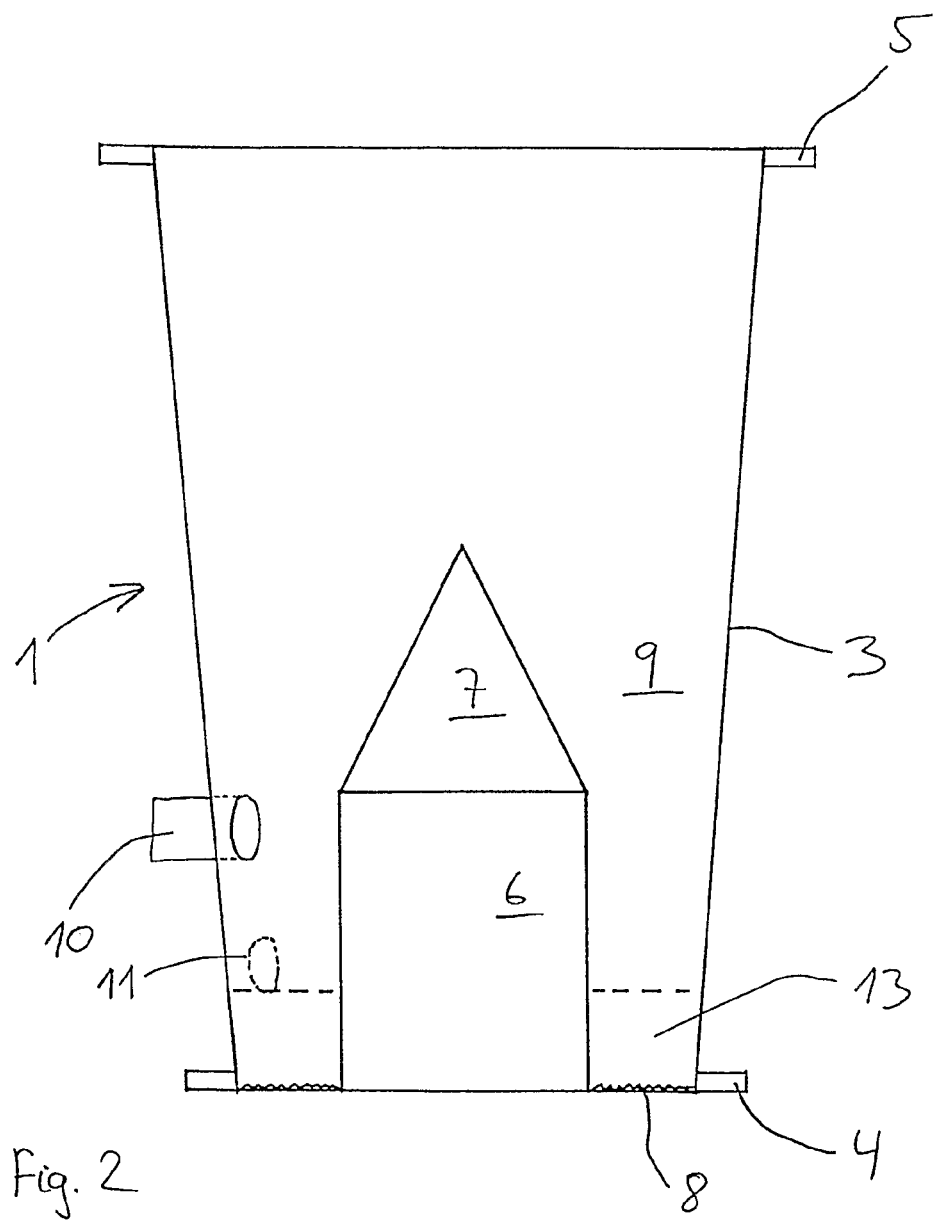
Figure 3:
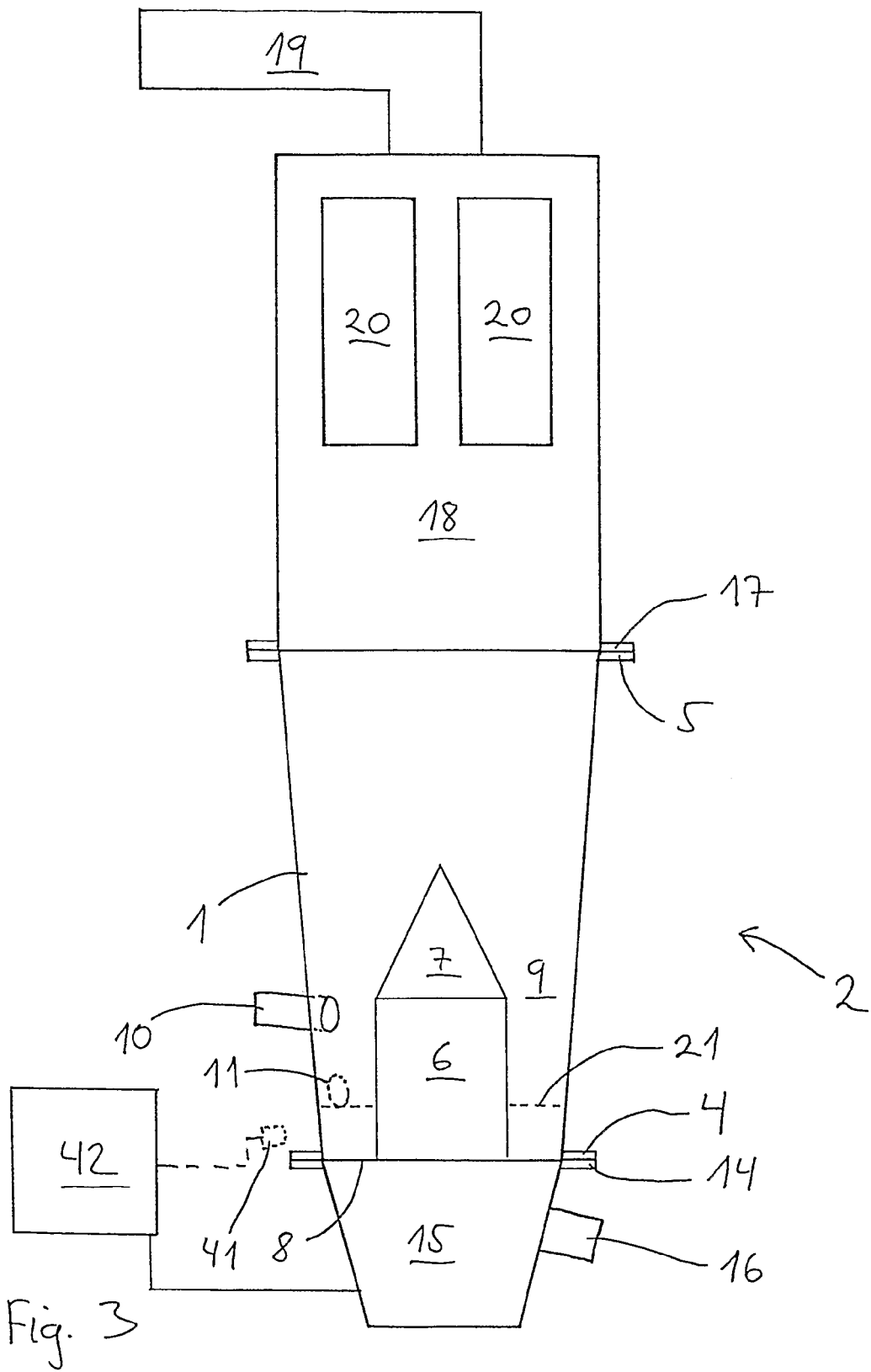
Figure 4:
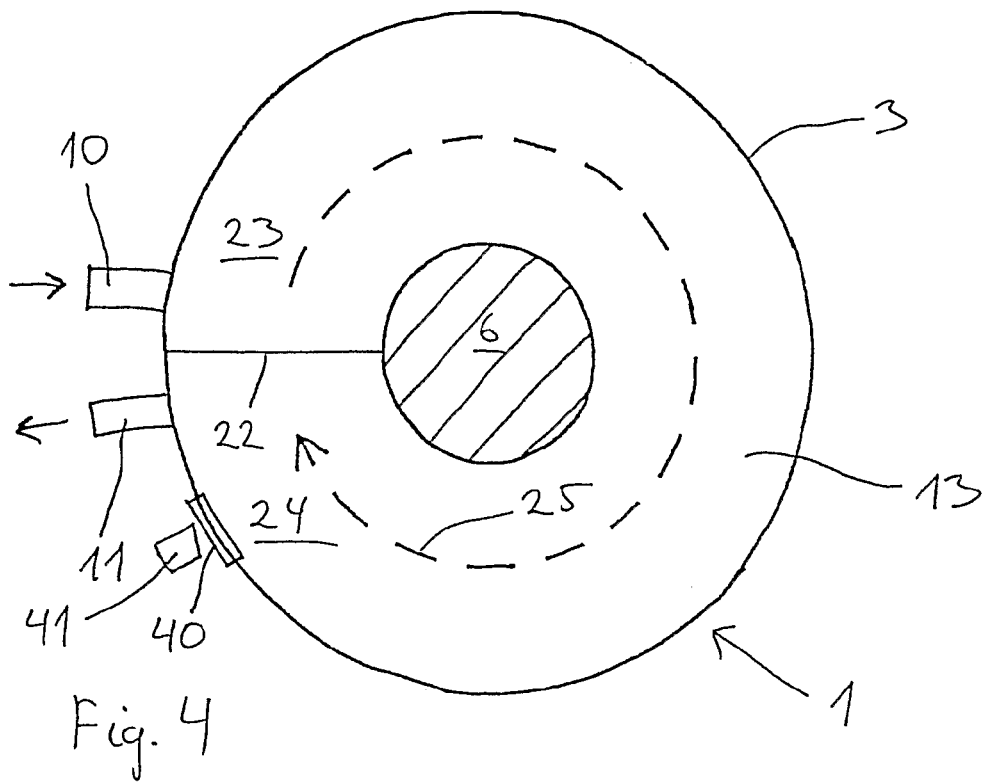
Figure 5:
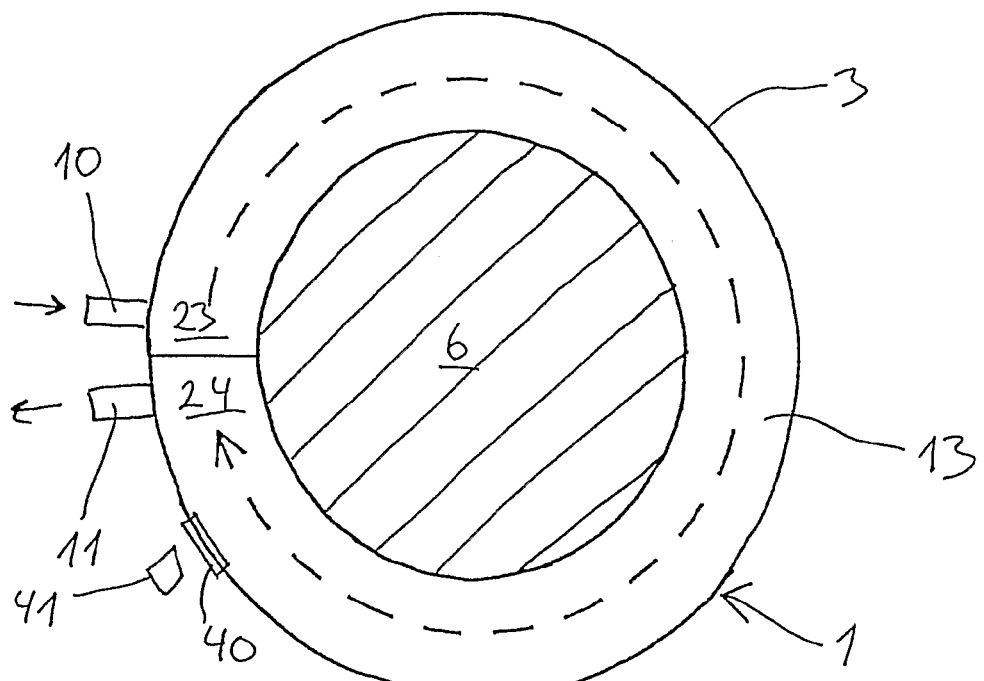
Figure 6:
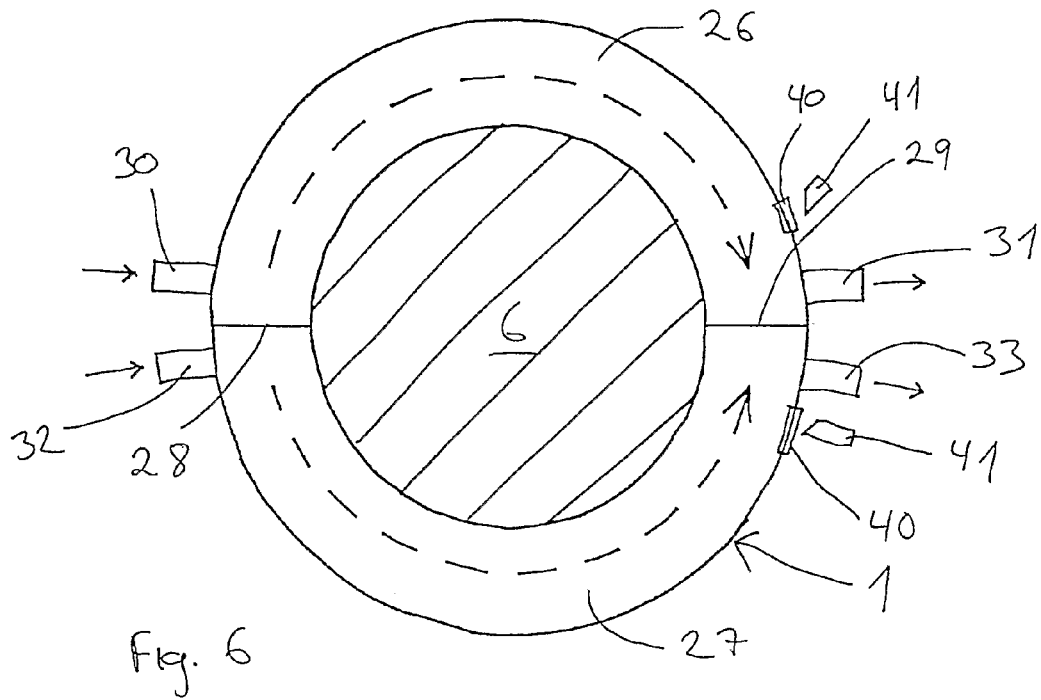
Figure 7:
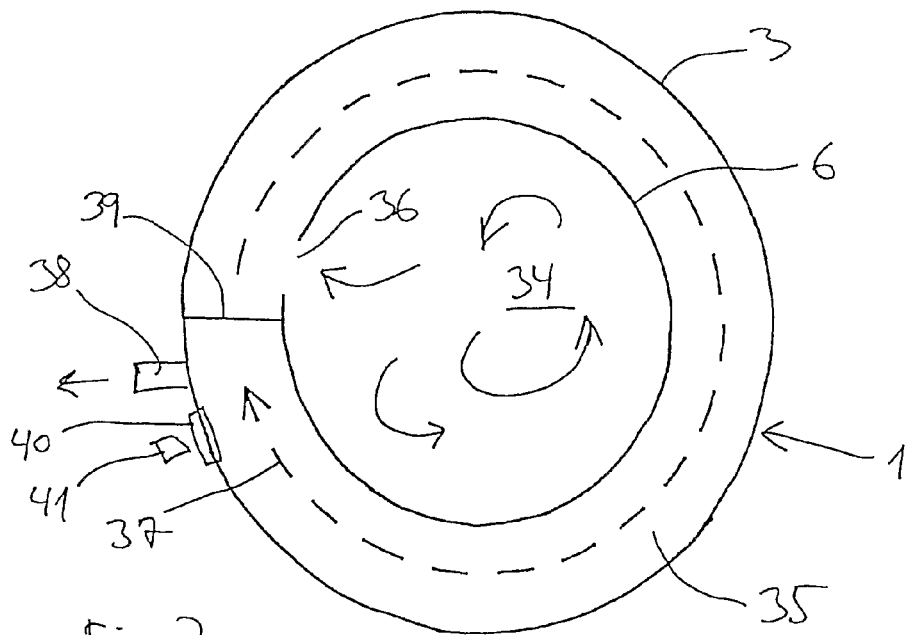
Figure 8:
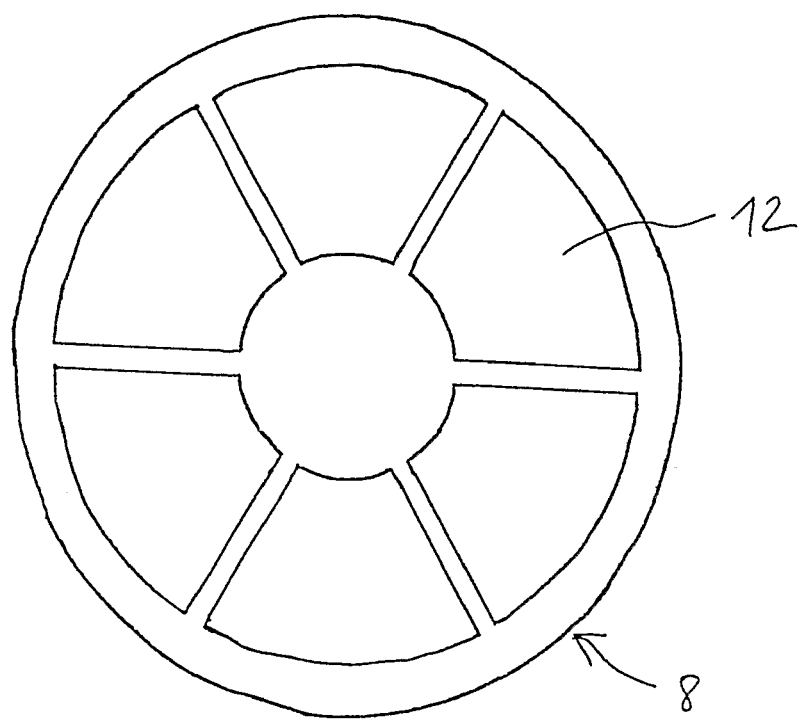
Figure 9:
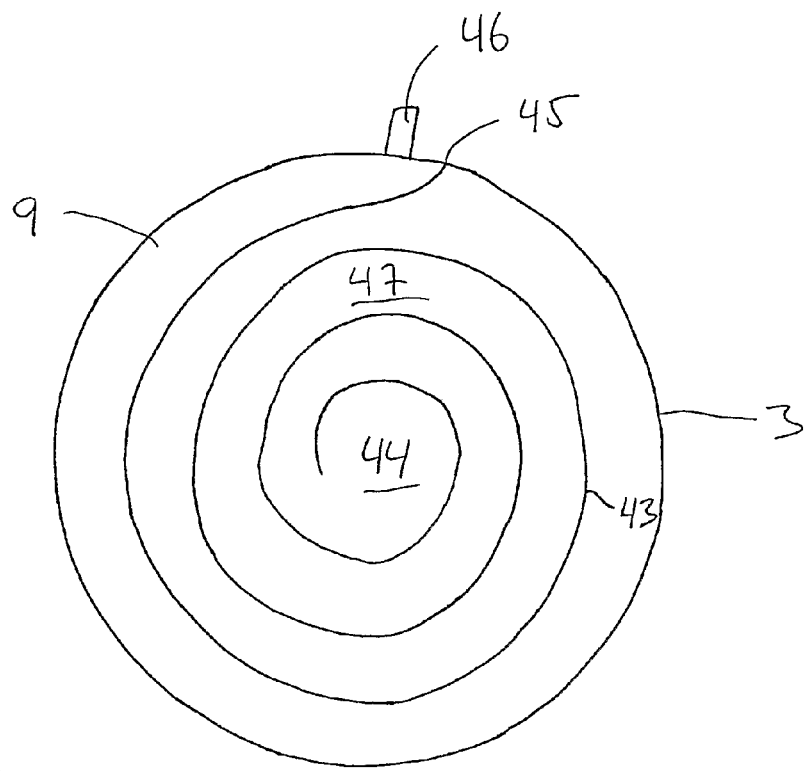
Figure 10:
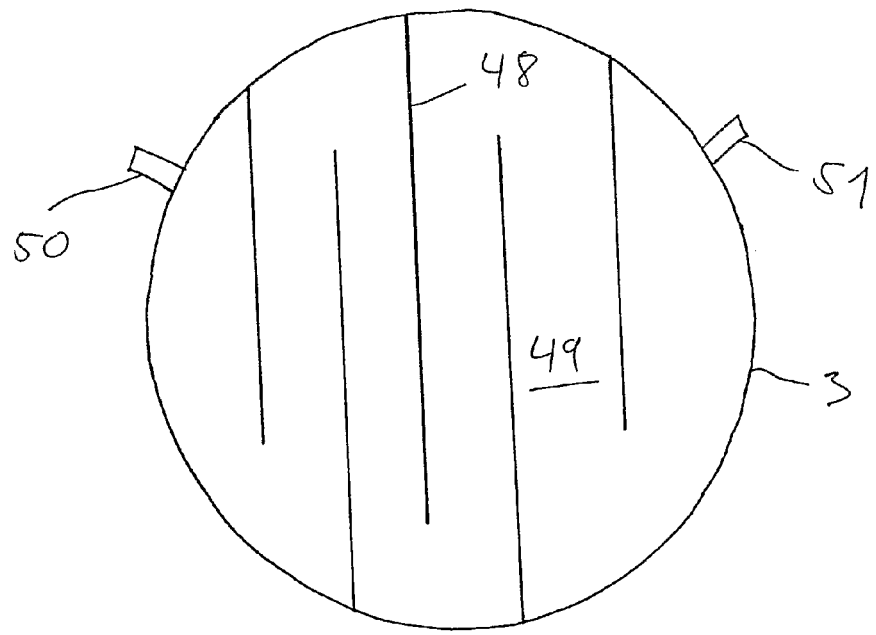

The invention will now be explained in more detail below by means of examples of embodiments with reference to the very schematic drawing, in which FIG. 1 is a perspective top view of a fluid bed apparatus module according to the invention, FIG. 2 is a diagrammatic sectional view of the fluid bed apparatus module in FIG. 1, FIG. 3 is a diagrammatic sectional view of a fluid bed apparatus incorporating the fluid bed apparatus module in FIG. 1, FIG. 4 is a diagrammatic sectional top view of the fluid bed apparatus module in FIG. 1, FIG. 5 to 7 are diagrammatic sectional top views of other embodiments of the fluid bed apparatus module in FIG. 4, FIG. 8 is a diagrammatic top view of an embodiment of a bed plate for the fluid bed apparatus module in FIG. 1, and FIGS. 9 and 10 are top views of different embodiments of the fluid bed apparatus module in FIGS. 4 and 5.

FIGS. 1 and 2 show a fluid bed apparatus module 1 for use in a fluid bed apparatus as shown in FIG. 3. The fluid bed apparatus 2 according to the invention may, for example, be used for drying a partially dried and still moist powdered or particulate product, such as a pharmaceutical product, or a health care product. The moist product to be dried in the fluid bed apparatus may, for example, have been produced in a spray drying process or in an extrusion process. Apart from drying, the apparatus is also suitable for granulation, agglomeration or coating. Although the apparatus according to the invention is especially suitable for the mentioned processes in the pharmaceutical industry, the invention is also applicable for other products as well as to fluid bed reactors in general.

The fluid bed apparatus module 1 shown in FIG. 2 comprises a cone-shaped outer wall 3 having a lower flange connection 4 and an upper flange connection 5. Concentrically with the outer wall 3 is arranged a cylindrical core 6, the upper end of which is closed by means of a cone-shaped top part 7. Both the outer wall 3 and the core 6 may have other configurations than shown, such as cylindrical, conical or combinations thereof. At the flange connection 4, the space between the outer wall 3 and the core 6 is closed by means of a bed plate 8 having not shown inlet openings in the form of perforations for a fluidising gas. The fluid bed apparatus module 1 could be fitted with different bed plates depending on the product to be processed. The bed plate may be connected detachably to the core and the outer wall. The outer wall 3 encloses a processing chamber 9 and is provided with a product inlet 10 and a product outlet 11 (shown by means of a broken line).

The bed plate 8 may be manufactured from a single plate of sheet metal or composed of several plate sections 12, see FIG. 8. The bed plate 8 or plate sections 12 may be fabricated in a well-known manner by stamping several holes in the form of perforations in the plate so that each hole is associated with a gill portion, for example as described in EP 0 474 949 B1 (NIRO HOLDING A/S), EP 0 507 038 B1 (NIRO HOLDING A/S), or EP 0 876 203 B1 (NIRO A/S) and marketed as FLEX PLATE™, NON-SIFTING GILL PLATE™ and BUBBLE PLATE™, respectively. The not shown gill portions of the bed plate 8 or plate sections 12 may be adapted to promote the transportation of product from the location of the product inlet 10 to the location of the product outlet 11 through a channel 13, 26, 27, 35 extending in the space between the outer wall 3 and the core 6, see FIGS. 4 to 7. The size and directions of the perforations may differ throughout the bed plate or sections thereof.

In FIG. 3, the fluid bed apparatus module 1 is shown mounted in a fluid bed apparatus 2. The lower flange connection 4 of the module 1 is connected with a corresponding flange connection 14 of a plenum chamber 15 having an inlet 16 for fluidising gas. The upper flange connection 5 of the module 1 is connected with a corresponding flange connection 17 of a filter chamber 18 having a gas outlet 19 and comprising filters 20 for filtering the fluidising gas before discharge through the outlet 19. The fluid bed apparatus module 1 may alternatively comprise the plenum chamber 15 with the inlet 16 for fluidising gas, whereby a flange connection of said inlet 16 would constitute the lower flange connection of the module 1.

In normal use of the fluid bed apparatus 2 shown in FIG. 3, the fluid bed apparatus module 1 is replaced by a normal batch-processing module (not shown) also having an outer wall enclosing a process chamber and provided with lower and upper flange connections in the same way as the module shown in FIGS. 1 and 2. However, the normal batch-processing module does not have a product inlet, a product outlet and a core. The batch-processing module is used in a well-known manner, whereby the module may be disconnected from the filter chamber 18 and filled with product to be processed, through its upper opening. Then the batch-processing module is connected to the filter chamber 18 by means of its upper flange connection and the product is processed by establishing a fluid bed by means of fluidising gas entering from the plenum chamber 15. After a batch of product has been processed, the module is again disconnected from the filter chamber 18 and, for instance, tipped, whereby the treated product may be poured out through the top opening of the batch-processing module, or otherwise emptied.

However, in batch processors a so-called back-mixing process takes place, and it may be difficult to determine the proper processing time for the individual batch. Although all individual particles of a batch of product are processed for the same time, the correct processing time for each individual particle may vary, depending on the size of the particle, its behaviour during processing, etc. If individual particles of the product are processed for too long time compared to their optimal processing time, they may be harmed, for instance due to heat sensitivity, and if individual particles are processed for too short time compared to their optimal processing time, the residual moisture of those particles may be too high. The individual particles of a processed batch of product will therefore have been processed for their optimal processing time in average only.

In cases where, for instance, ease of handling is desired, the above-described normal batch-processing module is replaced by a fluid bed apparatus module 1 according to the invention and shown separately in FIGS. 1 and 2, and in the mounted state in FIG. 3. The fluid bed apparatus module 1 according to the invention may also advantageously be employed in cases, where the supply of material is continuous, such as when material is supplied from a mixer or extruder. During processing, a powdered or granular product is continuously fed through the product inlet 10 into the processing chamber 9, where a fluidised bed of product indicated by means of a broken line 21 is established by means of a suitable fluidising gas supplied to the inlet 16 of the plenum chamber 15 and entering into the processing chamber 9 through the not shown perforations in the bed plate 8. The fluidised product flows from the location of the inlet 10 through the elongated channel 13 to the location of the product outlet 11, which in FIGS. 2 and 3 is indicated by means of broken lines.

FIG. 4 shows the channel 13, where the fluidised bed is established, seen from above. A vertical partition wall 22 extends between the core 6 and the outer wall 3, thereby separating a first end 23 of the channel 13 from a second end 24 of said channel. The product inlet 10 is arranged through the outer wall 3 at the first end 23 of the channel 13 and the product outlet 11 is arranged at the second end 24 of the channel 13. As seen in FIGS. 1 and 2, the product inlet 10 is arranged at the upper end of the core 6, and the product outlet 11 is arranged for a suitable bed height. The product outlet 11 is in FIGS. 2 and 3 located at the top level of the fluidised bed; however, it may also be located at a lower point, such as indicated in FIG. 1, in order to allow lumps to exit. In case of a lower position of the outlet 11, it may be provided with a kind of gate, valve or similar device that may be regulated in order to maintain the desired level of the fluidised bed. According to the invention, a substantially continuous product outlet should be construed to comprise such a regulated outlet, because the outlet during a period of time in average will be continuous. Similarly, a substantially continuous product inlet should be construed to comprise a regulated inlet, whereby the inlet during a period of time in average will be continuous.

There may also be provided one outlet at about the level shown in FIGS. 2 and 3 and a separate lump outlet provided with a gate or the like at a lower position for occasional opening.

The fluidised product forms a plug-flow from the first end 23 to the second end 24 of the elongated channel 13, as indicated by means of the arrow 25 in FIG. 4. In the embodiment shown in FIG. 4, the length L of the channel 13, measured along the centre line of the channel, is approximately six times greater than the width W of the channel 13. FIG. 5 shows another embodiment of the fluid bed apparatus module 1, whereby the length L of the channel 13 is approximately 15 times greater than the width W of the channel 13. By designing the relationship between the length L and the width W of the channel 13, a plug-flow suitable for the product to be treated may be achieved. According to the invention, it is thereby an advantage that it is possible to have a range of different fluid bed apparatus modules 1 designed for different types of plug-flow and with different perforated plates. It is then possible to fit the fluid bed apparatus 2 with a fluid bed apparatus module 1 specially designed for the product to be treated.

According to the invention, a partition element is arranged in the processing chamber in order to promote a so-called plug-flow, whereby the residence time of individual particles in the processing chamber is better controlled, than if no partition element were present, because the flow of material is guided in a direction from the inlet to the outlet. Consequently, individual particles receive a more equal treatment in the processing chamber.

FIG. 6 shows another embodiment of the fluid bed apparatus module 1 adapted for two separate plug-flows. Two separate channels 26, 27 are separated by means of to partition walls 28, 29, the first channel 26 has a product inlet 30 and a product outlet 31, and the second channel 27 has a product inlet 32 and a product outlet 33. In this way, it is possible to treat two separate continuous flows of product at the same time. It is possible to, for instance, treat product in the first channel 26 in a fluid bed apparatus, discharge the product through the product outlet 31 for further treatment in a different apparatus, and re-enter the product into the fluid bed apparatus through the product inlet 32, treat the product in the second channel 27 of the module 1, and eventually discharge the treated product through the product outlet 33. Furthermore, it is possible to use only the first channel 26 or only the second channel 27. In this case, it may be advantageous, if the plenum chamber 15 for fluidising gas is divided accordingly having separate plenum chambers for the first and the second channels 26, 27. Eventually, it would even be possible to treat two different products at the same time with a module 1 shown in FIG. 6 or performing different processes in the two chambers. In the embodiment shown in FIG. 6, it may be an advantage, if one or both of the partition walls 28, 29 is or are adjustable in the longitudinal direction of the elongated channels 26, 27, so that the length of the channels 26, 27 may be varied according to individual requirements.

FIG. 7 shows yet another embodiment of the fluid bed apparatus module 1 according to the invention. In this embodiment, the core 6 is hollow and surrounds a separate fluid bed 34 of the back-mixing type. The product to be treated enters through a product inlet located above the fluid bed 34 and is consequently not visible in the figure. After treatment in the fluid bed 34, the product enters the surrounding channel 35 formed between the core 6 and the outer wall 3 through an opening 36 in the wall of the core 6. The fluidised product then forms a plug-flow in the channel 35 in the direction of the arrow 37 and finally exits through the product outlet 38. As in the embodiments shown in FIGS. 4 and 5, a partition wall 39 separates a first and a second end of the channel 35. In this embodiment, it may similarly be of advantage, if the plenum chamber 15 is divided into two separate plenum chambers serving the central fluid bed 34 of the back-mixing type and the plug-flow fluid bed in the channel, respectively.

The channel or channels 13, 26, 27, 35 of the fluid bed apparatus module may be equipped with a window 40 with an associated near-infrared (NIR) device 41 or a device based on another analysis technology, for instance such as microwaves, in order to monitor product characteristics, such as residual moisture. The window 40 and the device 41 are preferably located at the second end of the channel, near the product outlet 11, 31, 33, 38, in order to monitor the characteristics of the product where the treatment is almost finished. The window 40 may be arranged in the outer wall 3, in the cylindrical core 6 or in the bed plate 8. Furthermore, the device 41 may be suspended from above the fluidised bed. As indicated in FIG. 3, the fluid bed apparatus 2 comprises a computer 42 adapted to control operational parameters, such as flow rate and temperature of the fluidising gas and product inlet flow, in dependence of measured parameters, such as residual moisture of product treated in the apparatus, measured by means of the near-infrared device 41.

Furthermore, the product outlets may have the form of a suction pipe, arranged through the outer wall 3 of the module 1, and having a downwardly directed inlet end. The suction pressure may be controlled by the computer in dependence of a measured differential pressure across the bed plate 8. The differential pressure may be measured by means of pressure sensors arranged on each side of the bed plate 8, respectively, at a product outlet end of each channel.

In the above described different embodiments of the fluid bed apparatus module according to the invention, different kind of processing equipment may be installed. For instance, spraying means for coating of granules may be provided, for instance located at the bottom of a vertical tube that is open at its bottom, so that the granules may recirculate several times through the tube before leaving. Several of such spraying devices may be provided in an elongated channel of the apparatus, for instance located in separate interconnected cells arranged in the channel.

The fluid bed apparatus module 1 according to the invention may also advantageously be supplied as a retrofit unit for existing batch fluid bed apparatuses.

FIG. 9 shows another embodiment of the fluid bed apparatus module 1 according to the invention, whereby a helical wall 43 extends from a central area 44 of the processing chamber 9 to the outer wall 3, and the helical wall 43 is connected to the outer wall at a point 45. A not shown product inlet is arranged in the processing chamber at the central area 44, and a product outlet 46 is arranged through the outer wall at the point 45, where the helical wall 43 is connected to the outer wall. An elongated channel 47 forming a plug-flow area is thereby provided.

FIG. 10 shows yet another embodiment of the fluid bed apparatus module 1 according to the invention, whereby parallel partition walls 48 are arranged alternately connected to opposite parts of the circumferential outer wall 3 in such a way that an elongated channel 49 forming a plug-flow area is formed, extending from a product inlet 50 to a product outlet 51.

In all of the above-described embodiments, the partition elements 6, 22, 28, 29, 39, 45, 48 may be height adjustable, so that a certain degree of back-mixing may be promoted by permitting a part of the product to flow over the partition element or elements, although in general, a plug-flow is intended.

The invention claimed is:

1. A method of processing a pharmaceutical product in a fluid bed apparatus, comprising the following steps:
   batch processing a pharmaceutical product in a processing chamber enclosed by an outer wall of a first module of the fluid bed apparatus, whereby lower and upper flange connections of the first module are disconnected from corresponding lower and upper flange connections of a supply of fluidising gas and of a filter chamber for gas discharge, respectively, of the apparatus,
   replacing the first module of the fluid bed apparatus by a second module of the fluid bed apparatus, and connecting lower and upper flange connections of the second module with the corresponding lower and upper flange connections of the apparatus, and
   processing a pharmaceutical product in a processing chamber enclosed by an outer wall of the second module of the fluid bed apparatus, wherein the replacement of the first module by the second module results in the arrangement of at least one partition element in the processing chamber, so that at least one elongated channel is formed in the processing chamber, thereby defining a plug-flow area, by that at least one continuous product inlet of the module is connected with a substantially continuous product supply of the apparatus, by that at least one continuous product outlet of the module is connected with a substantially continuous product discharge of the apparatus, and by that a continuous flow of pharmaceutical product forms a plug-flow through the elongated channel.

2. A method according to claim 1, wherein the partition element is arranged in the form of a core in the processing chamber and at least one partition wall extending between the core and the outer wall.

3. A method according to claim 1, wherein a near-infrared device, a microwave device or the like, arranged at a window in a wall of the second module, is connected with a computer of the apparatus.

4. A fluid bed apparatus for processing a pharmaceutical product comprises at least two interchangeable modules, each comprising an outer wall enclosing a processing chamber and having a lower flange connection and an upper flange connection, the lower flange connection being adapted to connection with a flange connection of the fluid bed apparatus for the supply of fluidising gas, and the upper flange connection being adapted to connection with a flange connection of a filter chamber of the fluid bed apparatus for gas discharge, wherein one of the modules is a batch-processing module, wherein a second one of the modules is a continuous-type module, in which at least one partition element is arranged in the processing chamber, so that at least one elongated channel is formed in the processing chamber, thereby defining a plug-flow area, and in that at least one substantially continuous product inlet and at least one substantially continuous product outlet are arranged in the second module.

5. A fluid bed apparatus according to claim 4, wherein the partition element has the form of a core arranged centrally in the processing chamber and at least one partition wall extending between the core and the outer wall.

6. A fluid bed apparatus according to claim 5, wherein each elongated channel is provided with a product inlet arranged through the outer wall at a first end of the channel and a product outlet arranged through the outer wall at a second end of the channel.

7. A fluid bed apparatus according to claim 5, wherein an upper end of the core is closed by means of a cone-shaped top part.

8. A fluid bed apparatus according to claim 7, wherein a lower end of the cone-shaped top part is located below a midpoint between the upper flange connection and the lower flange connection.

9. A fluid bed apparatus according to claim 5, wherein a bed plate having inlet openings for a fluidising gas is arranged at the lower flange connection and extends between the core and the outer wall.

10. A fluid bed apparatus according to claim 4, wherein a length L of each channel is more than 5 times greater than, and preferably more than 10 times greater than, a horizontal width W of said channel.

11. A fluid bed apparatus according to claim 5, wherein the core is hollow and surrounds a separate fluid bed area of the back-mixing type.

12. A fluid bed apparatus according to claim 5, wherein the core is cylindrical, that the outer wall has a circular cross-section, and that the core is arranged substantially concentrically with the outer wall.

13. A fluid bed apparatus according to claim 4, wherein a device for monitoring product characteristics, such as by means of near-infrared spectroscopy or microwaves, is arranged at a product outlet end of at least one of the channels.

14. A fluid bed apparatus according to claim 13, wherein the device for monitoring product characteristics is placed at a window arranged in a wall of the fluid bed apparatus module.

15. A fluid bed apparatus according to claim 4, wherein the upper flange connection and the lower flange connection of the fluid bed apparatus modules are adapted to be connected with corresponding flange connections of a plenum chamber and of a filter chamber, respectively, by means of air cylinder driven clamping devices.

16. A fluid bed apparatus according to claim 4, wherein the apparatus comprises a computer adapted to control operational parameters, such as flow rate and temperature of the fluidising gas and product inlet flow, in dependence of measured parameters, such as residual moisture of product treated in the apparatus measured by means of the device for monitoring product characteristics.

* * * * *